(12) United States Patent
Welch et al.

(10) Patent No.: US 8,430,114 B2
(45) Date of Patent: Apr. 30, 2013

(54) HYDROPHOBIC VENT ASSEMBLY

(75) Inventors: Michael H. Welch, Davisburg, MI (US);
Andrew Laskovy, Auburn Hills, MI (US); Hoang L. Vo, Madison Heights, MI (US); Kenneth C. Tesner, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 348 days.

(21) Appl. No.: 12/855,812

(22) Filed: Aug. 13, 2010

(65) Prior Publication Data
US 2011/0056574 A1 Mar. 10, 2011

Related U.S. Application Data

(60) Provisional application No. 61/240,603, filed on Sep. 8, 2009.

(51) Int. Cl.
*F24D 19/08* (2006.01)
*F16H 57/02* (2006.01)

(52) U.S. Cl.
USPC ........................................ 137/197; 74/606 R

(58) Field of Classification Search .................. 137/197, 137/199, 429, 430, 432, 433, 583; 74/606, 74/606 R; 180/337, 344, 346; 220/326; 55/320, 385.4, 510
See application file for complete search history.

(56) References Cited

U.S. PATENT DOCUMENTS

| | | | | |
|---|---|---|---|---|
| 3,422,982 A | * | 1/1969 | Myers et al. | 220/374 |
| 3,622,033 A | * | 11/1971 | Butler et al. | 220/371 |
| 5,024,345 A | * | 6/1991 | Deweerdt | 220/366.1 |
| 5,914,415 A | * | 6/1999 | Tago | 55/385.4 |
| 6,447,565 B1 | * | 9/2002 | Raszkowski et al. | 55/385.4 |

* cited by examiner

*Primary Examiner* — John Rivell
*Assistant Examiner* — Kevin Barss

(57) ABSTRACT

A vent assembly connectable to a transmission housing includes a stem, a membrane and a cap. The stem has an annular flange, a first end, a second end, and a through bore extending between the first end and the second end. The first end is connectable to the transmission housing and the second end has at least one flange and an annular rim. The membrane is located on the second end of the stem over the bore. The cap has a base and an annular wall extending from the base. The annular wall of the cap is deformed at a terminal end against the annular flange of the stem at discrete locations, where an undeformed portion of the annular wall of the cap creates at least one channel axially extending along the stem. The at least one channel creates a path between the cap and the flange of the stem.

20 Claims, 3 Drawing Sheets

HYDROPHOBIC VENT ASSEMBLY

CROSS-REFERENCE TO RELATED APPLICATIONS

This application claims priority to U.S. Provisional Application No. 61/240,603, filed on Sep. 8, 2009, which is hereby incorporated in its entirety herein by reference.

TECHNICAL FIELD

The present disclosure relates to a vent assembly for a transmission, and more particularly to an assembly for venting an enclosed cavity or housing of a transmission.

BACKGROUND

The statements in this section merely provide background information related to the present disclosure and may or may not constitute prior art.

For example, integrating a transmission power inverter module (TPIM) into a transmission requires the establishment of a totally dry cavity. Moreover, such a cavity must be vented because of pressure variations in the transmission housing due to temperature differences. However, the presence of water in a liquid or steam state in the cavity would be incompatible with the function and operation of the TPIM. Conventional vents may prevent water in liquid form from entering the TPIM cavity, however, such vents cannot prevent water in steam form from entering the TPIM cavity.

One known vent solution uses a Polytetrafluoroethylene (PTFE) membrane to protect the cavity from water. Disadvantageously, this conventional vent assembly has a direct path for water to accumulate on top of the PTFE membrane and freeze from uncontrolled water in engine compartment. The PTFE membrane cannot breathe if covered with ice. While current transmission vent assemblies achieve their intended purpose, the need for new and improved vent assembly configurations which prevent water from accumulating on the vent is ongoing. Accordingly, there is a need in the art for a transmission vent assembly having improved packaging while providing improved venting capability.

SUMMARY

The present invention provides a vent assembly connectable to a transmission housing. The vent assembly includes a stem, a membrane and a cap. The stem has a first end, a second end, an annular flange, and a through bore extending between the first end and the second end. The first end is attached to the transmission housing, and the second end has at least one flange and an annular rim. The at least one flange projects from the annular rim, and the annular flange is disposed around an outer surface of the stem. The membrane is located on the second end of the stem over the bore. The at least one flange positions the membrane over the bore. The cap has a base and an annular wall extending from the base. The base of the cap covers the second end of the stem and the annular wall has a terminal end. The annular wall of the cap is deformed at the terminal end against the annular flange of the stem at discrete locations. An undeformed portion of the annular wall of the cap creates at least one channel axially extending along the stem. The at least one channel creates a path between the cap and the flange of the stem that allows fluid to exit the cap and substantially prevents fluid from re-entering the cap.

In an embodiment of the present invention, at least one secondary channel is located on the annular rim. The at least one secondary channel creates a pathway for fluid accumulated on the membrane to drain over the annular rim and out of the cap.

In another embodiment of the present invention, the at least one flange includes a locator that projects from the annular rim. The locator is positioned around an outer perimeter of the at least one flange, and the locator further positions the membrane over the bore.

In yet another embodiment of the present invention, the cap is deformed against the stem along discrete locations to create four equally spaced channels.

In an embodiment of the present invention, the at least one flange holds the cap off the annular rim, thereby substantially preventing the cap from closing off the bore of the stem.

In another embodiment of the present invention, the second end of the stem includes four equally spaced flanges.

In yet another embodiment of the present invention, the first end of the stem is one of press fit and threaded into an aperture formed in a wall of the transmission housing.

In an embodiment of the present invention, the membrane is constructed from PTFE.

In another embodiment of the present invention, the membrane has a circular outer profile.

In yet another embodiment of the present invention, the membrane is adhered to an outer surface of the stem.

In an embodiment of the present invention, the membrane operates as a selective barrier allowing the passage of air in and out of and blocking the passage of fluid and steam into the bore of the stem.

In another embodiment of the present invention, the transmission housing includes a wall that defines a cavity. The vent assembly operates to vent air in and out of the cavity and substantially prevents fluid from entering the cavity.

In yet another embodiment of the present invention, the cap is one of a jiggle cap and a vent cap.

The above features and advantages and other features and advantages of the present invention are readily apparent from the following detailed description of the best modes for carrying out the invention when taken in connection with the accompanying drawings.

DESCRIPTION

Figure 1:
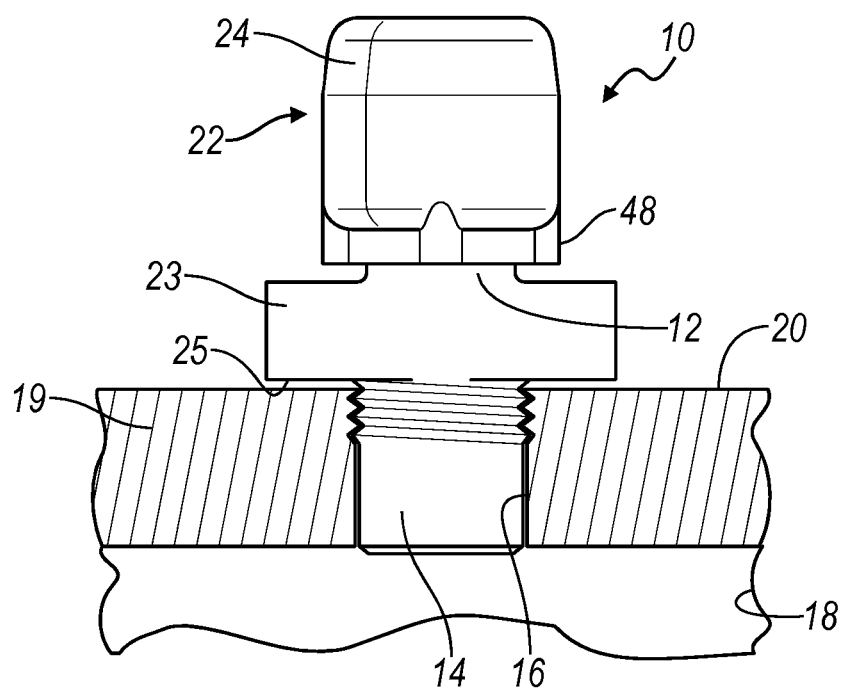
FIG. 1 is a side view of a hydrophobic vent assembly for use in a transmission, in accordance with an embodiment the present invention.

Referring now to FIG. 1, a side view of a hydrophobic vent assembly 10 for use in a transmission is illustrated, in accordance with an embodiment the present invention. Vent 10 has a vent stem 12 having a first end 14 connectable to an aperture 16 in a cavity 18 in a transmission housing 20. First end 14 of vent stem 12 may be press fit into the aperture 16, threaded into or similarly attached to a wall 19 of housing 20. Vent 10 functions to vent air out or in of cavity 18 to equalize pressure in housing 20 and prevent water from entering the cavity. A second end 22 of vent 10 is covered by a vent cap or jiggle cap 24. Preferably cap 24 is a protective metal jiggle cap. Vent stem 12 also includes an annular base 23 located proximate first end 14. In one embodiment, an outer surface 25 of the base 23 abuts wall 19 of housing 20, thereby sealing stem 12 against housing 20.

Figure 2:
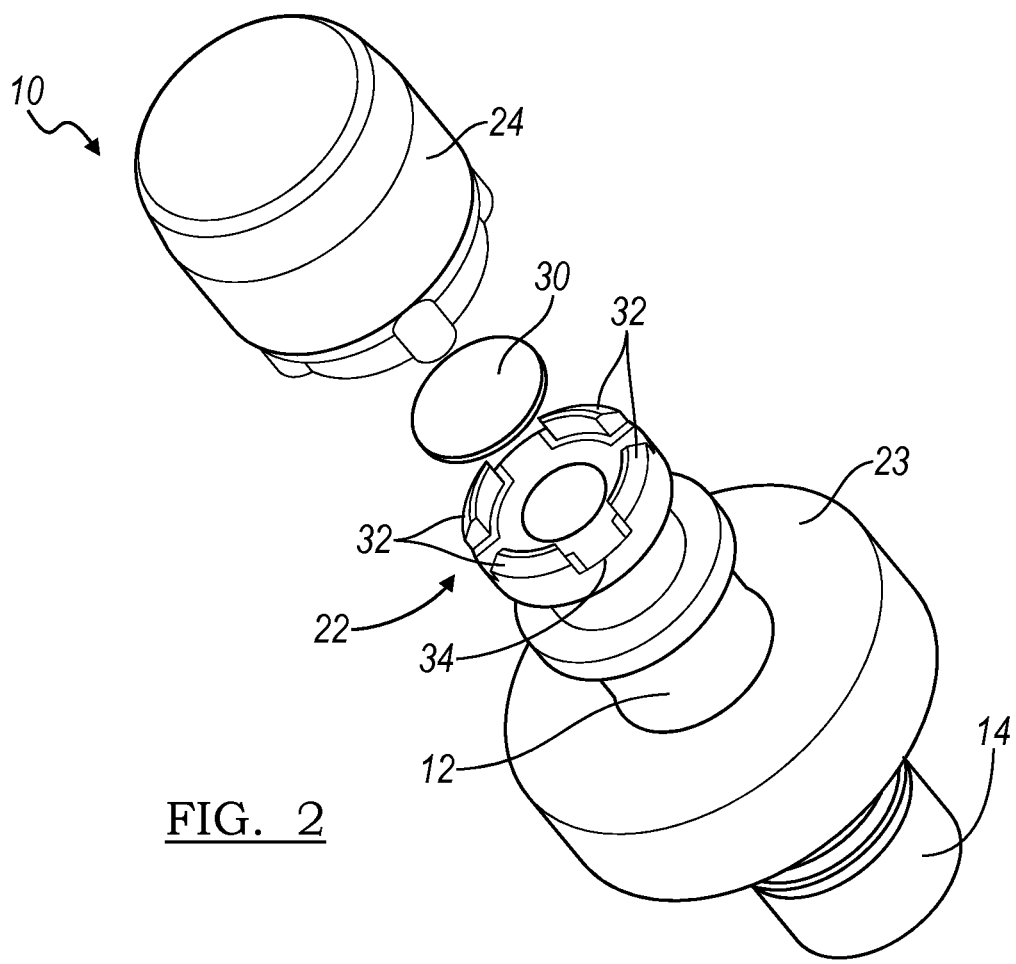
FIG. 2 is a perspective exploded view of the hydrophobic vent assembly for use in a transmission, in accordance with an embodiment the present invention.

Referring now to FIG. 2, a perspective exploded view of the hydrophobic vent assembly for use in a transmission is illustrated, in accordance with an embodiment the present invention. As shown in FIG. 2, a circular shaped membrane 30 is positioned between the cap 24 and second end 22 of vent stem 12. In an embodiment of the present invention, vent stem 12 is a cylindrical metal stem. In another embodiment of the present invention, membrane 30 is a circular shaped membrane made of Polytetrafluoroethylene (PTFE). However, those skilled in the art will appreciate that the membrane 30 may be constructed from other materials that allow for the membrane 30 to operate as a selective barrier thereby allowing the passage of air in and out of and blocking the passage of fluid and steam into bore 36 of vent stem 12. Additionally, second end 22 of vent stem 12 has a plurality of upstanding flanges 32 protruding from an annular rim 34. As shown in both of FIGS. 2-3, four equally spaced flanges 32 are shown, however those skilled in the art will appreciate that any number of flanges may be used as well. Flanges 32 position membrane 30 over a through bore 36 in stem 12 and hold cap 24 off of second end 22, thereby preventing cap 24 from closing off bore 36. Flanges 32 are spaced apart around rim 34.

In one embodiment, second end 22 of stem 12 includes at least one channel 38 and a raised locator 39. The channels 38 are located between flanges 32, and are depressions located along rim 34 and within stem 12, creating a pathway for fluid travel. Specifically, referring to FIG. 4, membrane 30 provides a selective barrier over bore 36, only allowing air and not steam and fluid into bore 36. As a result, fluid may accumulate around or on top of membrane 30. However, channels 38 provide a pathway such that any fluid trapped around membrane 30 may drain over rim 34 and out of vent assembly 10. Referring back to FIG. 3, locators 39 are raised portions of stem 12 that are positioned around the outer perimeter of each flange 32, and protrude from rim 34. However, flanges 32 protrude from rim 34 at a greater distance when compared to locators 39. Referring now to FIG. 4, locators 39 are employed to further position membrane 30 over bore 36. In the embodiment as shown, locators 38 make contact with an outer side 41 of membrane 30, thereby securing membrane 30 in place over bore 36. Locators 39 may also be used to define the outer boundaries of channels 38. Preferably, in one embodiment membrane 30 is adhered to second end 22 of vent stem 12 to securely position membrane 30 over bore 36.

Figure 3:
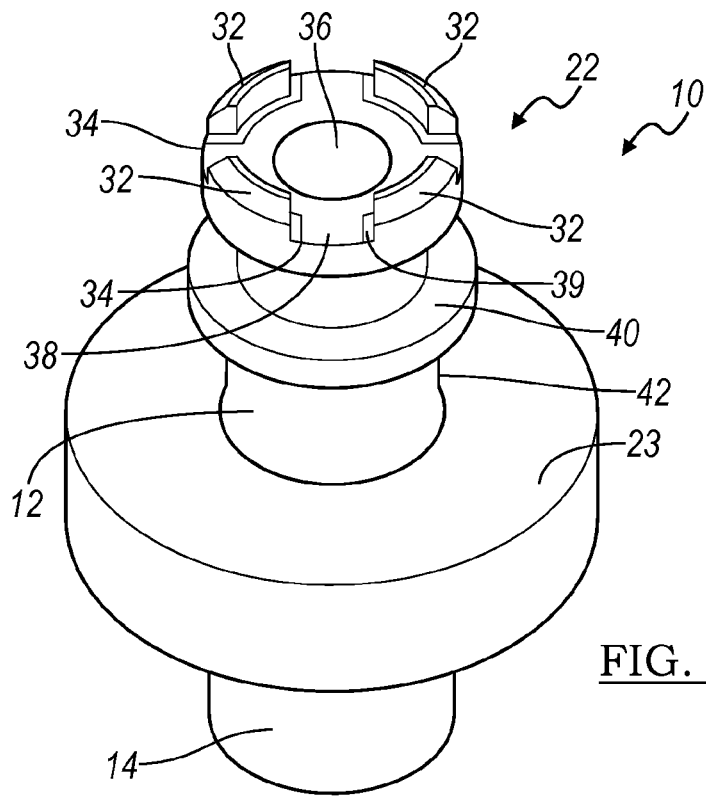
FIG. 3 is a perspective view of the vent stem of the hydrophobic vent assembly, in accordance with an embodiment the present invention.
Figure 4:
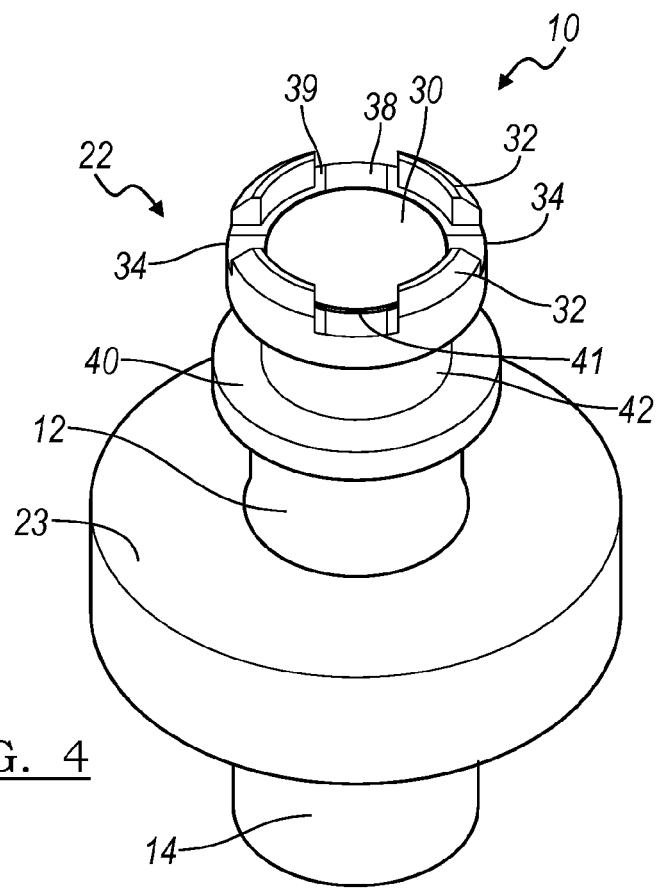
FIG. 4 is a perspective view of the vent stem and the membrane of the hydrophobic vent assembly, in accordance with an embodiment the present invention.

With continuing reference to FIGS. 3-4, a perspective view of the vent stem 12 and the membrane 30 of the hydrophobic vent assembly 10 is illustrated, in accordance with an embodiment the present invention. Vent assembly 10 further includes an annular flange 40 disposed around a circumference of stem 12. Annular flange 40 is positioned proximate to second end 22 and protrudes radially from a cylindrical outer wall 42 of stem 12.

Figure 5:
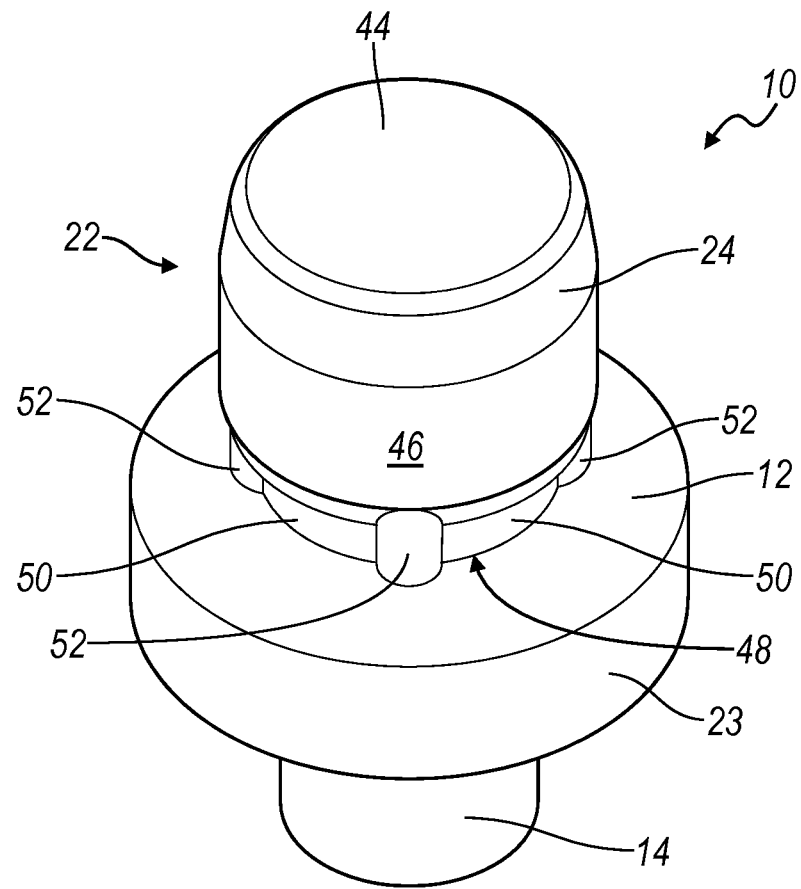
FIG. 5 is a perspective view of the cap installed on the vent stem of the hydrophobic vent assembly, in accordance with an embodiment the present invention.

Referring now to FIG. 5, a perspective view of the cap 24 installed on the vent stem 12 of the hydrophobic vent assembly 10 is illustrated, in accordance with an embodiment the present invention. Cap 24 has a base 44 and an annular wall 46. Annular wall 46 terminates at a terminal end 48. Base 44 and annular wall 46 of cap 24 define an interior cavity (not shown) of cap 24, where the interior cavity of cap 24 receives second end 22 of stem 22. Specifically, base 44 of cap 24 covers second end 22 of stem 12. Cap 24 is crimped or otherwise deformed or pressed onto flange 40 at terminal end 48 of annular wall 46 at discrete portions 50 around the perimeter of cap 24. Thus, cap 24 completely covers second end 22 of stem 12. This discrete and spaced apart crimping or deformation of cap 24 forms channels 52 which extend axially along stem 12. Specifically, the undeformed portions of annular wall 46 create channels 52 that are formed between an inner surface of cap 24 (not shown) and outer wall 42 (FIG. 4) of stem 12.

Providing axially extending channels 52 allow water or other fluids to exit cap 24 while at the same time preventing fluids from re-entering the interior cavity of cap 24. That is, channels 52 define a path that allows water to exit cap 24 while at the same time makes it difficult for water to re-enter cap 24. Of course, channels 52 allow air to flow to and from the cavity 18 through bore 36. Turning to FIG. 1, terminal end 48 of cap 24 is offset from annular base 23, such that channels 52 are not blocked or otherwise sealed off. Thus, air may still travel to and from cap 24 through channels 52. Turning back to FIG. 5, in one embodiment cap 24 could include four equally spaced channels 52 for allowing for fluid to exit cap 24, however it is understood that any number of channels 52 may be used as well. Referring to both FIGS. 2 and 5, in one exemplary embodiment stem 12 could have four equally spaced flanges 32 that correspond with the four equally spaced channels 52.

Beneficially, the present invention allows venting of enclosed areas (i.e. transmission cavities) without letting water or steam into the enclosed area, while at the same time taking up a minimum amount of packaging space. Moreover, the metal jiggle cap 24 will provide extra thermal protection of the PTFE membrane 30 from direct heat exposure (radiation and convection) that could damage PTFE membrane 30. Additionally, the metal jiggle cap 24 prevents direct spray from water sources and accumulation on the PTFE membrane 30, thus preventing water from covering the PTFE membrane. Frozen water covering the membrane would seal vent 10 shut, and prevents the vent assembly 10 from being able to vent air out or in of cavity 18.

Advantageously, the instant invention utilizes a self adhesive PTFE membrane 30 and applies the membrane to a simply manufactured body, turned and drilled, which is then pressed into a cavity wall or cover. This allows the cavity to reside at atmosphere pressure while keeping outside elements out. Moreover, the relative small size of the vent assembly 10 allows for easy packaging in tight engine compartments.

While the best modes for carrying out the invention have been described in detail, those familiar with the art to which this invention relates will recognize various alternative designs and embodiments for practicing the invention within the scope of the appended claims.

What is claimed is:

1. A vent assembly connectable to a transmission housing, comprising:
 a stem having a first end, a second end, an annular flange, and a through bore extending between the first end and the second end, wherein the first end is adapted to be attached to the transmission housing, and the second end has at least one flange and an annular rim, wherein the at least one flange projects axially from the annular rim, and wherein the annular flange is disposed around an outer surface of the stem proximate the second end;

a membrane located on the second end of the stem over the bore, wherein the at least one flange positions the membrane over the bore; and a cap having a base and an annular wall extending from the base to a terminal end, wherein the base of the cap covers the second end of the stem, wherein the annular wall of the cap is deformed at the terminal end against the annular flange of the stem at discrete locations, and wherein an undeformed portion of the annular wall of the cap creates at least one axially extending channel, wherein the at least one channel creates a path between the cap and the annular flange of the stem that allows fluid to exit the cap and substantially prevents fluid from re-entering the cap.

2. The vent assembly of claim 1 wherein at least one secondary channel is located on the annular rim, wherein the at least one secondary channel creates a pathway for fluid accumulated on the membrane to drain over the annular rim and out of the cap.

3. The vent assembly of claim 1 wherein the at least one flange includes a locator that projects from the annular rim, wherein the locator is positioned around an outer perimeter of the at least one flange, and wherein the locator further positions the membrane over the bore.

4. The vent assembly of claim 1 wherein the cap is deformed against the stem along discrete locations to create four equally spaced channels.

5. The vent assembly of claim 1 wherein the at least one flange holds the cap off the annular rim, thereby substantially preventing the cap from closing off the bore of the stem.

6. The vent assembly of claim 1 wherein the second end of the stem includes four equally spaced flanges.

7. The vent assembly of claim 1 wherein the first end of the stem is one of press fit and threaded into an aperture formed in a wall of the transmission housing.

8. The vent assembly of claim 1 wherein the membrane is constructed from PTFE.

9. The vent assembly of claim 1 wherein the membrane has a circular outer profile.

10. The vent assembly of claim 1 wherein the membrane is adhered to an outer surface of the stem.

11. The vent assembly of claim 1 wherein the membrane operates as a selective barrier allowing the passage of air in and out of and blocking the passage of fluid and steam into the bore of the stem.

12. The vent assembly of claim 1 wherein the transmission housing includes a wall that defines a cavity, wherein the vent assembly operates to vent air in and out of the cavity and substantially prevents fluid from entering the cavity.

13. The vent assembly of claim 1 wherein the cap is one of a jiggle cap and a vent cap.

14. A vent assembly, comprising:
a transmission housing having a wall defining an aperture, and wherein the wall defines a transmission housing cavity;
a stem having a first end, a second end, an annular flange, and a through bore extending between the first end and the second end, wherein the first end is attached to the aperture defined by the wall of the transmission housing, and the second end has at least one flange and an annular rim, wherein the at least one flange projects axially from the annular rim, and wherein the annular flange is disposed around an outer surface of the stem proximate the second end;
a membrane located on the second end of the stem over the bore, wherein the at least one flange positions the membrane over the bore, and wherein the membrane operates as a selective barrier allowing the passage of air in and out of and blocking the passage of fluid and steam into the bore of the stem; and a cap having a base and an annular wall extending from the base to a terminal end, wherein the base of the cap covers the second end of the stem, wherein the annular wall of the cap is deformed at the terminal end against the annular flange of the stem at discrete locations, and wherein an undeformed portion of the annular wall of the cap creates at least one primary, axially extending channel, wherein the at least one primary channel creates a path between the cap and the annular flange of the stem that allows fluid to exit the cap and substantially prevents fluid from re-entering the cap;

wherein at least one secondary channel is located on the annular rim, wherein the at least one secondary channel creates a pathway for fluid accumulated on the membrane to drain over the annular rim and out of the cap;

wherein the at least one flange holds the cap off the annular rim, thereby substantially preventing the cap from closing off the bore of the stem, and wherein the vent assembly operates to vent air in and out of and substantially prevents fluid from entering the cavity of the transmission housing.

15. The vent assembly of claim 14 wherein the at least one flange includes a locator that projects from the annular rim, wherein the locator is positioned around an outer perimeter of the at least one flange, and wherein the locator further positions the membrane over the bore.

16. The vent assembly of claim 14 wherein the second end of the stem includes four equally spaced flanges.

17. The vent assembly of claim 14 wherein the cap is deformed against the stem along discrete locations to create four equally spaced primary channels.

18. The vent assembly of claim 14 wherein the membrane is constructed from PTFE.

19. The vent assembly of claim 14 wherein the membrane is adhered to an outer surface of the stem.

20. A vent assembly, comprising:
a transmission housing having a wall defining an aperture, and wherein the wall defines a transmission housing cavity;
a stem having a first end, a second end, an annular flange, and a through bore extending between the first end and the second end, wherein the first end is attached to the aperture defined by the wall of the transmission housing, and the second end has four equally spaced flanges and an annular rim, wherein the flanges project from the annular rim, and wherein the annular flange is disposed around an outer surface of the stem proximate the second end;
a membrane constructed from PTFE located on the second end of the stem over the bore, wherein the flanges position the membrane over the bore, and wherein the membrane operates as a selective barrier allowing the passage of air in and out of and blocking the passage of fluid and steam into the bore of the stem; and
a metal cap having a base and an annular wall extending from the base to a terminal end, wherein the base of the cap covers the second end of the stem, wherein the annular wall of the cap is deformed at the terminal end against the annular flange of the stem at discrete locations, and wherein undeformed portions of the annular wall of the cap create four equally spaced, axially extending primary channels, wherein the primary channels create a path between the cap and the annular flange of the stem that allows fluid to exit the cap and substantially prevents fluid from re-entering the cap, wherein four secondary channels are located on the annular rim, wherein the secondary channels create a pathway for fluid accumulated around on the membrane to drain over the annular rim and out of the cap;

wherein the flanges hold the cap off the annular rim, thereby substantially preventing the cap from closing off the bore of the stem, wherein the at least one flange includes a locator that projects from the annular rim, wherein the locator is positioned around an outer perimeter of the at least one flange, and wherein the locator further positions the membrane over the bore, and wherein the vent assembly operates to vent air in and out of and substantially prevents fluid from entering the cavity of the transmission housing.

\* \* \* \* \*